(12) United States Patent  
Powell et al.

(10) Patent No.: US 9,151,696 B2
(45) Date of Patent: Oct. 6, 2015

(54) FREE-STATE SEAL PLATE FUNCTIONAL GAGE TOOL

(71) Applicant: Solar Turbines Incorporated, San Diego, CA (US)

(72) Inventors: James Brian Powell, San Diego, CA (US); Scott L. Stafford, San Diego, CA (US); Luvern John Weber, San Diego, CA (US); Terry Toshio Akiyama, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 327 days.

(21) Appl. No.: 13/712,867

(22) Filed: Dec. 12, 2012

(65) Prior Publication Data

US 2014/0157596 A1     Jun. 12, 2014

(51) Int. Cl.
 | | |
 |---|---|
 | *B23Q 17/00* | (2006.01) |
 | *G01M 15/14* | (2006.01) |
 | *F02C 7/28* | (2006.01) |
 | *B23Q 17/20* | (2006.01) |
 | *F01D 25/28* | (2006.01) |

(52) U.S. Cl.
CPC ............... *G01M 15/14* (2013.01); *B23Q 17/20* (2013.01); *F01D 25/285* (2013.01); *F02C 7/28* (2013.01); *F05D 2260/83* (2013.01); *Y10T 29/49771* (2015.01); *Y10T 29/49776* (2015.01)

(58) Field of Classification Search
CPC ..... F01D 25/285; F02C 7/28; F05D 2260/83; G01M 15/14; Y10T 29/49771; Y10T 29/49776; B23Q 17/20
See application file for complete search history.

(56) References Cited

U.S. PATENT DOCUMENTS

| 4,491,787 A | 1/1985 | Akiyama et al. |
| 7,242,204 B2 * | 7/2007 | Otaguro et al. .......... 324/750.19 |

FOREIGN PATENT DOCUMENTS

| DE | 2049419 A1 | 4/1972 |
| DE | 2121246 A1 | 11/1972 |
| JP | 04-072502 A | 3/1992 |

* cited by examiner

*Primary Examiner* — Ryan J Walters
(74) *Attorney, Agent, or Firm* — Procopio, Cory, Hargreaves & Savitch LLP (57) ABSTRACT

A gage tool (700) for inspecting tolerances of a gas turbine engine seal plate (430) includes a base plate (710) and a top plate (720). The base plate (710) includes a base opening (712) and a slot (711) with an annular shape sized to receive a seal plate (430). The top plate (720) includes a top opening (723). The base opening (712) and top opening (723) each provide access to a portion of a seal plate (430) within the gage tool (700). The gage tool (700) also includes a first gage (750) with a probe tip for measuring a variation in an outer interlacing surface (433) of a seal plate (430) and a seal slide gage (740) for measuring a force required to rotate the seal plate (430) within the gage tool.

15 Claims, 6 Drawing Sheets

FREE-STATE SEAL PLATE FUNCTIONAL GAGE TOOL

TECHNICAL FIELD

The present disclosure generally pertains to gas turbine engines, and is more particularly directed toward a functional gage tool for a gas turbine engine free-state seal plate.

BACKGROUND

Gas turbine engines include compressor, combuster, and turbine sections. Certain components of a gas turbine engine may be subject to numerous tolerances. Some free-state tolerances may be difficult to determine and measure.

U.S. Pat. No. 4,491,787 to N. Akiyaroa discloses a device for measuring a flatness of a plate such as a silicon wafer, a GGG wafer, a printed circuit board, a ceramic substrate, or the like. The measuring device is provided with a disc which is disposed in parallel with the plate on one of the surfaces of the plate and is driven by a rotating drive source and a plurality of detectors for detecting a distance from the detector to the surface of the plate, the detectors being disposed on the surface closer to the disc. With this arrangement, distance data from the plurality of the detectors to the surface of the plate is obtained during the course of the rotation of the disc, and a flatness of die plate is measured.

The present disclosure is directed toward overcoming one or more of the problems discovered by the inventors.

SUMMARY OF THE DISCLOSURE

A gage tool for inspecting tolerances of a gas turbine engine seal plate is disclosed. The gage tool includes a base plate and a top plate. The base plate includes a slot with an annular shape sized to receive a seal plate. The baseplate also includes abase opening providing access to a portion of a seal plate that is placed within the gage tool. The top plate includes a top opening providing access to a portion of a seal plate that is placed within the gage tool. The gage tool also includes a first gage with a probe tip for measuring a variation in an outer interfacing surface of a seal plate. The gage tool further includes a seal slide gage for measuring a force required to rotate the seal plate within the gage tool.

A method for inspecting a gas turbine engine seal plate is also disclosed. The method includes calibrating a gage tool including a base plate with a slot and base opening, a top plate with a top opening, a first gage, a seal slide gage, and a gage master. The gage master is inserted into the slot and used to set a zero point for the first gage. The method also includes inserting a seal plate into the gage tool. The method includes measuring the force required to rotate the seal plate while the seal plate is inserted into the functional gage tool and measuring a profile of an interfacing surface at a predetermined gage point. The method also includes accepting the seal plate if the interfacing surface measures within a predetermined profile and if the force required to rotate the seal plate is under a predetermined amount. The method further includes rejecting the seal plate if the interfacing surface measures outside of the predetermined profile or if the force required to rotate the seal plate is over the predetermined amount.

DETAILED DESCRIPTION

The systems and methods disclosed herein include a functional gage tool for a gas turbine engine seal plate. In embodiments, the functional gage tool includes a base plats with a slot and a top plate with a ring insert. The slot and ring insert simulate the gas turbine engine disk assembly for the seal plate. In embodiments, the functional gage tool also includes a first gage and a seal slide gage. The first gage measures the profile of an outer interfacing surface on a seal plate chamfer, while the seal slide gage measures the force required to rotate the seal plate within the functional gage tool. The functional gage tool may provide a quick and accurate process to inspect the seal plate flatness and the profile of the outer interfacing surface.

Figure 1:
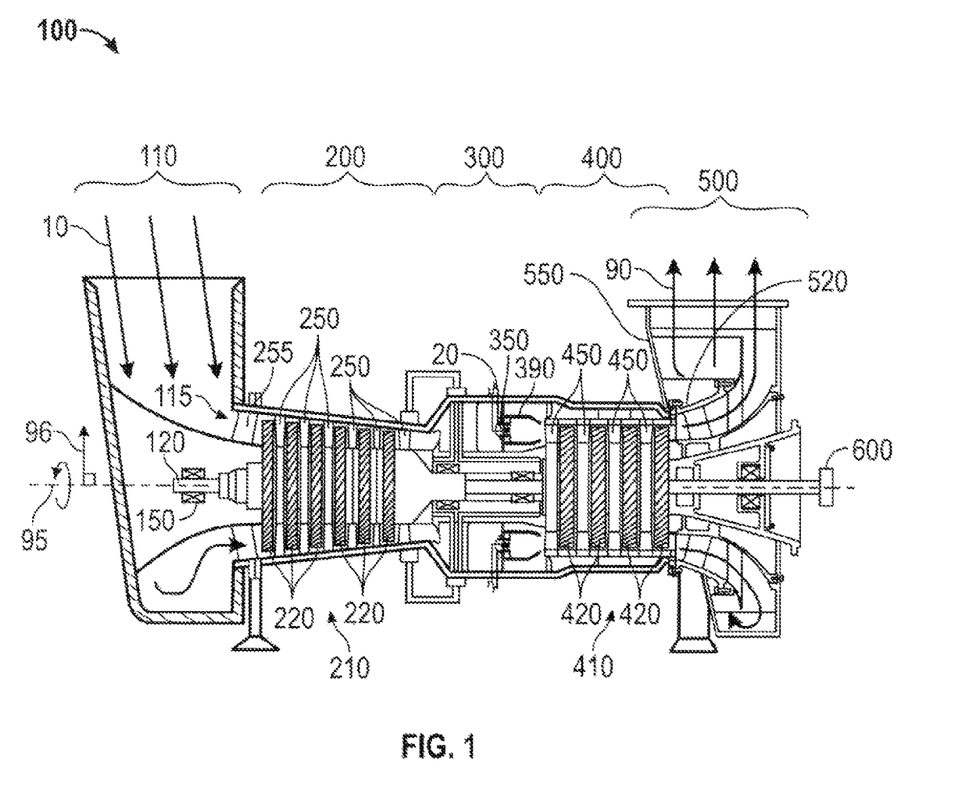
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated the compressor rotor assembly 210 is an axial flow rotor assembly. The compressor rotor assembly 230 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more injectors 350 and includes one or more combustion chambers 390.

The turbine 400 includes a turbine rotor assembly 410 and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk 421 (shown in FIG. 2) that is circumferentially populated with turbine blades 425 (shown in FIG. 2). Each turbine disk assembly 420 may also include a seal plate 430 (shown in FIG. 2). Turbine nozzles 450 axially precede each of the turbine disk assemblies 420. Each turbine disk assembly 420 paired with the adjacent turbine nobles 450 that precede the turbine disk assembly 420 is considered a turbine stage. Turbine nozzles 450 may be supported by a diaphragm 460 (shown in FIG. 2). Turbine 400 includes multiple turbine stages.

The exhaust 500 includes an exhaust diffuser 520 and an exhaust collector 550.

Figure 2:
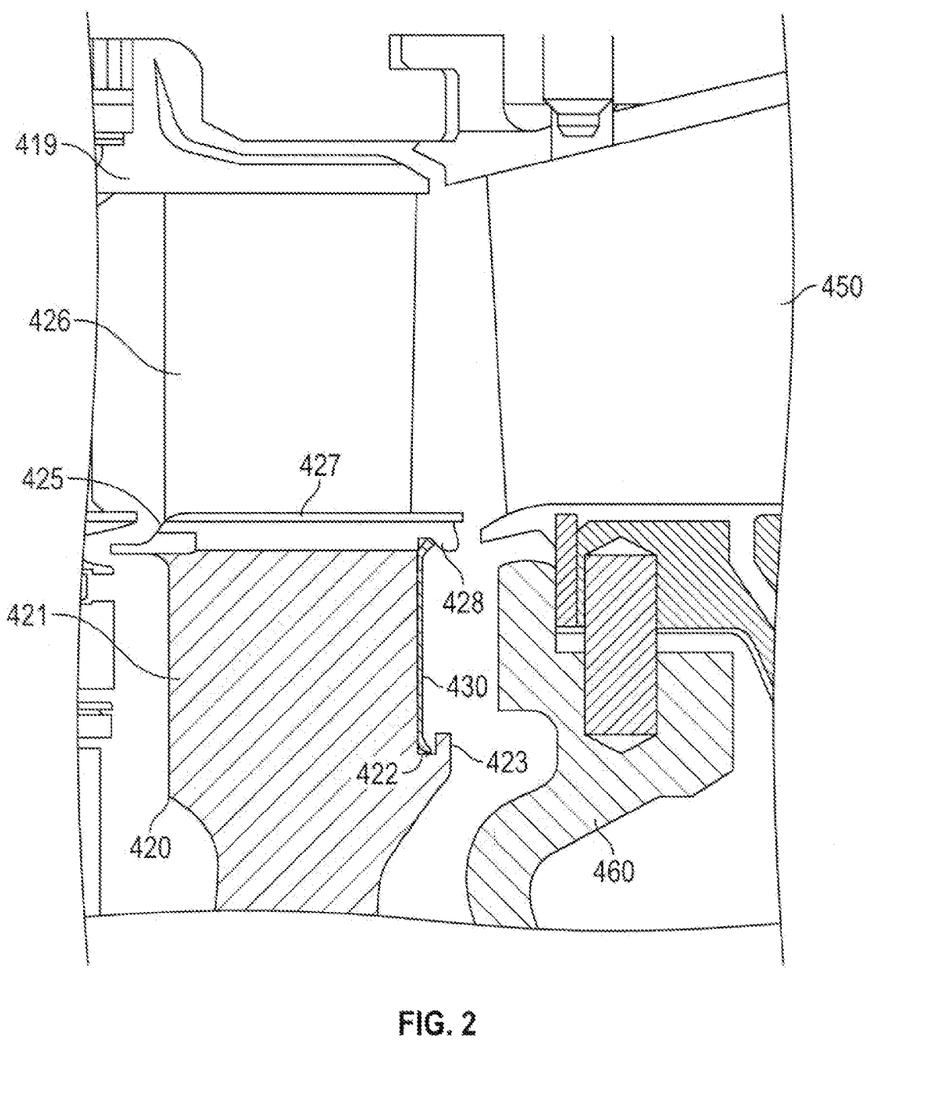
FIG. 2 is a cross-sectional view of a portion of a turbine of the gas turbine engine of FIG. 1.

FIG. 2 is a cross-sectional view of a portion of the turbine 400 of the gas turbine engine 100 of FIG. 1. Referring to FIG. 2, each turbine disk assembly 420 includes a turbine disk 421 and turbine blades 425 (only one shown in FIG. 2). Turbine disk 421 may include a disk groove 422 in the all side of the turbine disk 421 and may also include a disk hook 423 extending from the disk groove 422. Each turbine blade 425 includes an airfoil 426, a blade platform 427, and a blade root (not shown). The airfoil 426 extends radially outward from the blade platform 427 and the blade root extends in the direction opposite the airfoil 426. Blade platform 427 may include blade hook 428. Blade hook 428 extends from blade platform 427. Blade hook 428 may extend in a direction towards disk hook 423 and disk hook 423 may extend in a direction towards blade hook 428. Turbine 400 may include shrouds 419 located radially outward of and adjacent to airfoils 426.

Figure 3:
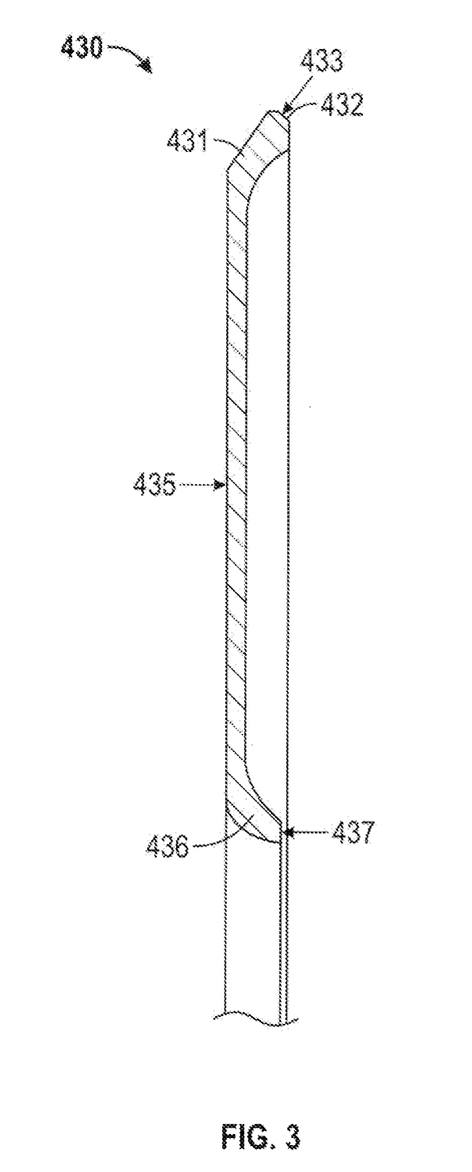
FIG. 3 is a cross-sectional view of the seal plate of FIG. 2.

Each turbine rotor assembly 410 may also include a seal plate 430. Seal plate 430 may be located axially aft of turbine disk 421 and may extend radially from blade hook 428 to disk hook 423 in the form of a disc or a ring. FIG. 3 is a view of a cross-section of the seal plate 430 of FIG. 2. Referring now to FIG. 3, seal plate 430 may include a central interfacing surface 435, an outer seal plate 431, and an inner seal plate 436. Central interfacing surface 435 may contact the aft side of turbine disk 421 as shown in FIG. 2. Central interfacing surface 435 may also contact the blade root of the turbine blades 425, covering the aft interface between turbine disk 421 and turbine blades 425.

Figure 4:
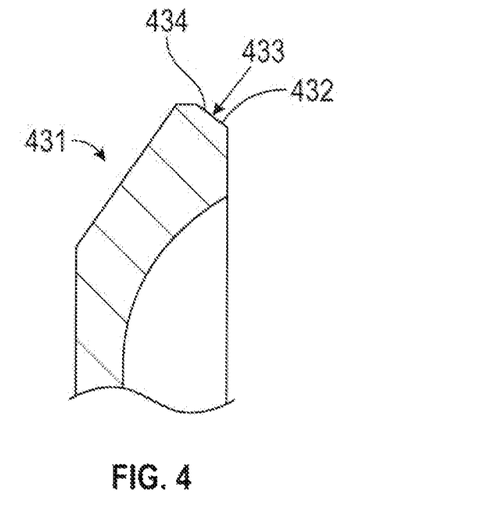
FIG. 4 is a view of a cross-section of the outer portion of the seal plate of FIG. 3.

FIG. 4 is a cross-sectional view of an outer portion of die seal plate of FIG. 3. Referring to FIGS. 3 and 4, outer seal plate 431 may extend away from central interfacing surface 435 and may extend away from inner seal plate 436. Outer seal plate 431 may include chamfer 432 and outer interfacing surface 433. Chamfer 432 may be angled to match the shape of blade hook 428. Outer interfacing surface 433 is the surface located on chamfer 432 and may contact blade hook 428 as shown in FIG. 2. Outer interfacing surface 433 includes chamfer gage point 434. Chamfer gage point 434 may be a predetermined location on outer interfacing surface 433 that a gage tool contacts to measure the profile of outer interlacing surface 433.

Referring again to FIG. 3, inner seal plate 436 may extend away from central interfacing surface 435 and may extend away from outer seal plate 431. Inner seal plate 436 may have an arced shape or profile and may include inner interfacing surface 437. Inner seal plate 436 may be installed within disk groove 422 with inner interfacing surface 43 contacting disk hook 423 as shown in FIG. 2. In one embodiment, inner interfacing surface 437 is parallel to central interfacing surface 435.

Figure 5:
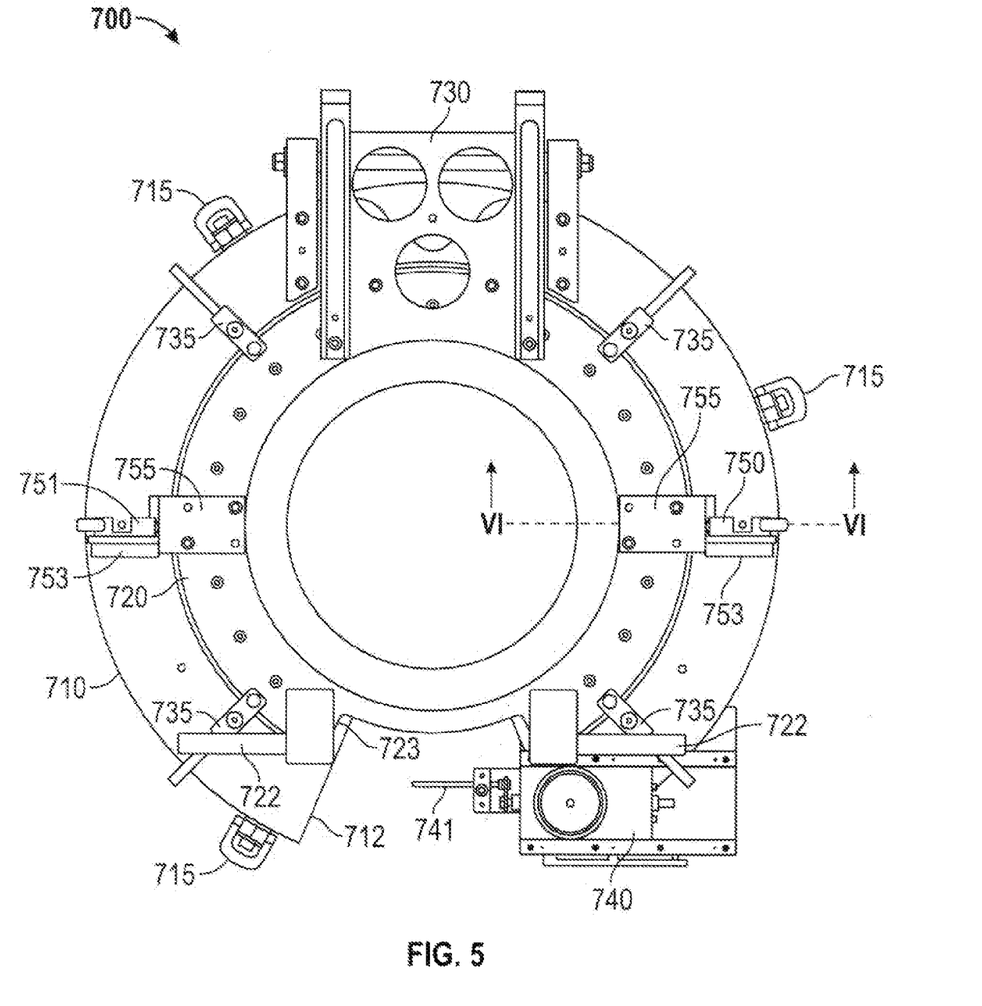
FIG. 5 is a plan view of a seal plate functional gage tool for the seal plate of FIG. 3.

FIG. 5 is a plan view of a functional gage tool 700 for the seal plate 430 of FIG. 3. The functional gage tool 700 is used to inspect the seal plate 430 to ensure the seal plate 430 falls within predetermined tolerances. The functional gage tool 700 may have a clam shell design and may include a base plate 710, a top plate 720, and a hinge 730. The base plate 710 may generally have a ring or a flat disc shape with a cylindrical surface. The base plate 710 may include a base opening 712 and hoist rings 715. The base opening 712 may be a cut out, slot, or gap in the cylindrical shape of the base plate 710. The base opening 712 may be configured to provide access to the seal plate 430 within the gage tool 700. Hoist rings 715 may be located at the cylindrical surface. In one embodiment, the base plate 710 includes three hoist rings 715.

The top plate 720 may be coupled to the base plate 710 by the hinge 730. The top plate 720 may also have a ring or a disc shape. The top plate 720 may include a top opening 723 and handles 722. The top opening 723 may align with the base opening 712 and may be a cut out, slot, or gap in the cylindrical shape of the top plate 720. The top opening 723 may be configured to provide access to the seal plate 430 within the gage tool 700. The base opening 712 and the top opening 723 may be located opposite the hinge 730. The handles 722 may also be located opposite the hinge 730, adjacent to the top opening 723.

The functional gage tool 700 may also include clamp assemblies 735, a first gage 750, a second, gage 751, and a seal slide, gage 740. Each clamp assembly 735 may be coupled to the base plate 710. Each clamp assembly 735 may rotate to lock or clamp the top plate 720 to the base plate 730 when the top plate 720 is in a closed position. In one embodiment, the functional gage tool 700 includes four clamp assemblies 735.

The first gage 750 and the second gage 751 may be coupled to the top plate 720. In the embodiment shown in FIG. 5, the first gage 750 and the second gage 751 are approximately one-hundred and eighty degrees apart. The hinge 730 may be approximately circumferentially equidistant between the first gage 750 and the second gage 751. The seal slide gage 740 may be located circumferentially between the first gage 750 and the second gage 751, opposite hinge 730 and adjacent the base opening 712 and the top opening 723. The seal slide gage 740 may be a force gage and may include a thumb ring 741. The thumb ring 741 may be aligned with and may be situated above the base opening 12 and the top opening 723. The seal slide gage 740 may be configured to measure the force required to rotate the seal plate 430 within the gage tool 700.

Figure 6:
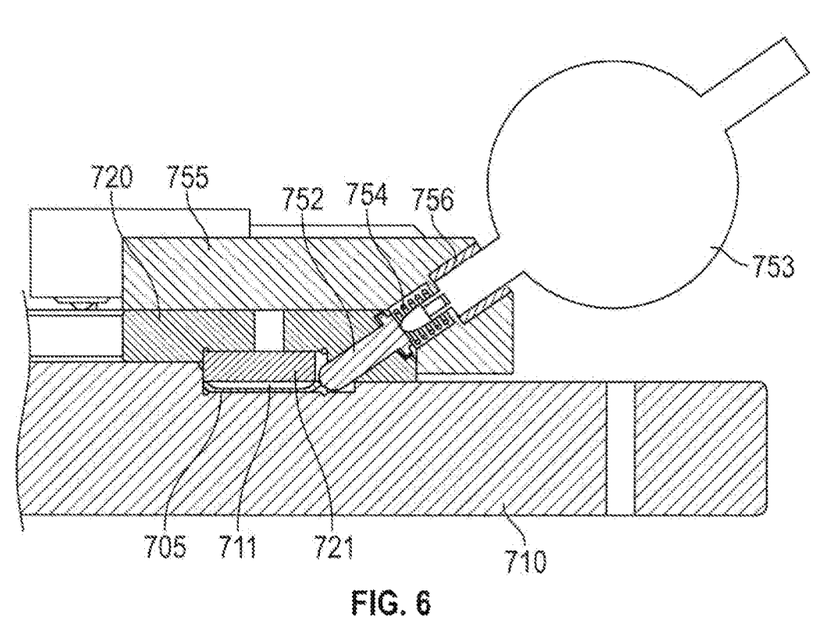
FIG. 6 is a cross-sectional view of the functional gage tool of FIG. 5.

FIG. 6 is a cross-sectional view of the functional gage tool 700 showing the first gage 750 of FIG. 5 with a gage master 705. The first gage 750 and the second gage 751 may be the same or similar devices. The first gage 750 and the second gage 751 may include indicators. In one embodiment, the first gage 750 and the second gage 751 include dial indicators. In another embodiment, the first gage 750 and the second gage 751 include a digital indicator 753. The description of the first gage 750 with regard to FIG. 6 may apply to the second gage 751.

Referring now to FIG. 6, the first gage 750 may include a probe tip 752, a compression spring 754, an indicator block 755, and a bushing 756. Probe tip 752 contacts outer interfacing surface 433 at chamfer gage point 434 when a seal plate 430 is placed within the functional gage tool 700. Probe tip 752 may be configured to measure a variation in the profile of outer interfacing surface 433. In the embodiment shown in FIG. 6, a plunger with a spherical tip is used on the probe tip 752. Other tips such as cylindrical tips or needle-shaped tips may also be used. Compression spring 754 may bias the probe tip 752 towards the seal plate 430. Indicator block 755 may hold probe tip 752, compression spring 754, and digital indicator 753 in place. Indicator block 755 may couple to top plate 720. A bushing 756 may be provided between indicator block 755 and digital indicator 753.

Base plate 710 includes a slot 711. Slot 711 may be an annular slot sized to receive seal plate 430. Top plate 720 may include a ring insert 721. Ring insert 721 may be sized with slot 711 to form an annular envelope that encapsulates seal plate 430 and simulates or is otherwise configured to simulate the space formed by turbine disk 421 and turbine blades 425 where the seal plate 430 is installed within the gas turbine engine 100. The cross-section of the annular envelope matches or is configured to match the general cross-section formed by turbine disk 421 and a turbine blade 425 where the seal plate is installed. Ring insert 721 may be formed of a harder material than the materials used for other components of the functional gage tool 700. The functional gage tool 700 may also include a gage master 705. The gage master 705 may be used to set the zero point of the indicator. The gage master 705 may have the same cross-section as the seal plate 430. In one embodiment, the gage master 705 is configured to duplicate the cross-section of a seal plate 430 in the perfect nominal condition. In another embodiment the gage master 705 is configured to duplicate the cross-section of a seal plate 430 in the maximum material condition. In yet another embodiment, the gage master 705 is configured to duplicate the cross-section of a seal plate 430 with the outer interfacing surface 433. In the perfect nominal condition, and all other relevant surfaces including the central interfacing surface 435 and the inner interfacing surface 437 in the maximum material condition.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and hitting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel 20 is added. Air 10 and fuel 20 are injected into the combustion chamber 390 via injector 350 and combusted. Energy is extracted front the combustion reaction via the turbine 400 by each stage of the series of turbine disk assemblies 420. Exhaust gas 90 may then be diffused in exhaust diffuser 520, collected and redirected. Exhaust gas 90 exits the system via an exhaust collector 550 and may be further processed (for example, to reduce harmful emissions, and/or to recover heat from the exhaust gas 90).

A portion of compressed air 10 may exit the compressor 200 and be redirected as cooling air. Some of this cooling air may be used to cool turbine blade 425 and turbine disk 421. Cooling air may leak aft from the interface of the interface of the turbine disk 421 and the root of the turbine blades 425. Seal plate 430 may reduce or prevent this leakage, which may improve the gas turbine engine performance and efficiency.

To prevent leakage, the spacing of seal plate 430 with turbine disk 421 and turbine blades 425 may be relatively small. Seal plate 430 may require relatively tight tolerances to ensure proper installation of seal plate 430 and to ensure a proper seal during gas turbine engine operations. In particular, the flatness of central interfacing surface 435, the straightness of central interfacing surface 435, and the profile of outer interfacing surface 433 may need to be within predetermined tolerances. In one embodiment, the flatness of central interfacing surface 435 needs to be within a tolerance of 0.018 in. (0.45 mm), the straightness of central interfacing surface 435 needs to be within a tolerance of 0.008 in. (0.203 mm), and the profile of outer interfacing surface 433 needs to be within a tolerance of 0.008 in. (0.203 mm). A seal plate 430 outside of the predetermined tolerances may bind during installation, which may increase installation times, prevent proper installation of turbine blades 425, and may increase manufacturing costs.

Seal plate 430 may have a relatively thin disk shape. The manufacturing processes such as machining and work hardening may cause internal stresses resulting in a potato chip effect or irregularities in the flatness of the disk shape. Measuring the flatness of central interfacing surface 435 and the profile of outer interfacing surface 433 may be difficult due to the relatively thin disk shape of seal plate 430. Any object that contacts, holds, or measures seal plate 430 may bead or deflect seal plate 430 which may prevent an accurate measurement of the tolerances of seal plate 430.

Functional gage tool 700 may be used to inspect the tolerances of seal plate 430 including the flatness and straightness of central interfacing surface 435 in a free-state, non-constrained condition, and the profile of outer interfacing surface 433 in a free-state, non-constrained condition. Functional gage tool 700 may be configured to simulate the disk assembly. Slot 711 and ring insert 721 may be constructed or configured to simulate the surfaces of turbine disk 421 and turbine blades 425 that contact outer interfacing surface 433, central interfacing surface 435, and inner interfacing surface 437 when seal plate 430 is installed into turbine 400.

The simulated space created by slot 711 and ring insert 721 may not clamp down on seal plate 430. The simulated space may allow a seal plate 430 with conforming tolerances to freely rotate within the functional gage tool 700. A seal plane 430 may be accepted as within tolerance if the seal plate 430 freely rotates within the functional gage tool 700 or if the seal plate 430 rotates with an applied force under a predetermined amount. The applied force to rotate the seal elate 430 may be measured by the seal slide gage 740. In the embodiment depicted in FIG. 3, the seal plate 430 may be accessed at the base opening 712 and the top opening 723. This type of inspection may provide for a quick and accurate inspection of the seal plate 430. This may reduce inspection times and may improve the manufacturing process by providing more accurately controlled tolerances on each seal plate 430 inspected.

The profile of outer interfacing surface 433 may be inspected by measuring the variation in outer interfacing surface 433 at chamfer gage point 434. First gage 750 and second gage 751 may be used to measure the variation in outer interfacing surface 433 at chamfer gage point 434. Deflection or bending of seal plate 430 caused by the probe tips 752 of first gage 750 and second gage 751 contacting seal plate 430 may be minimized or reduced by the restricted simulated space created by slot 711 and ring insert 721.

Figure 7:
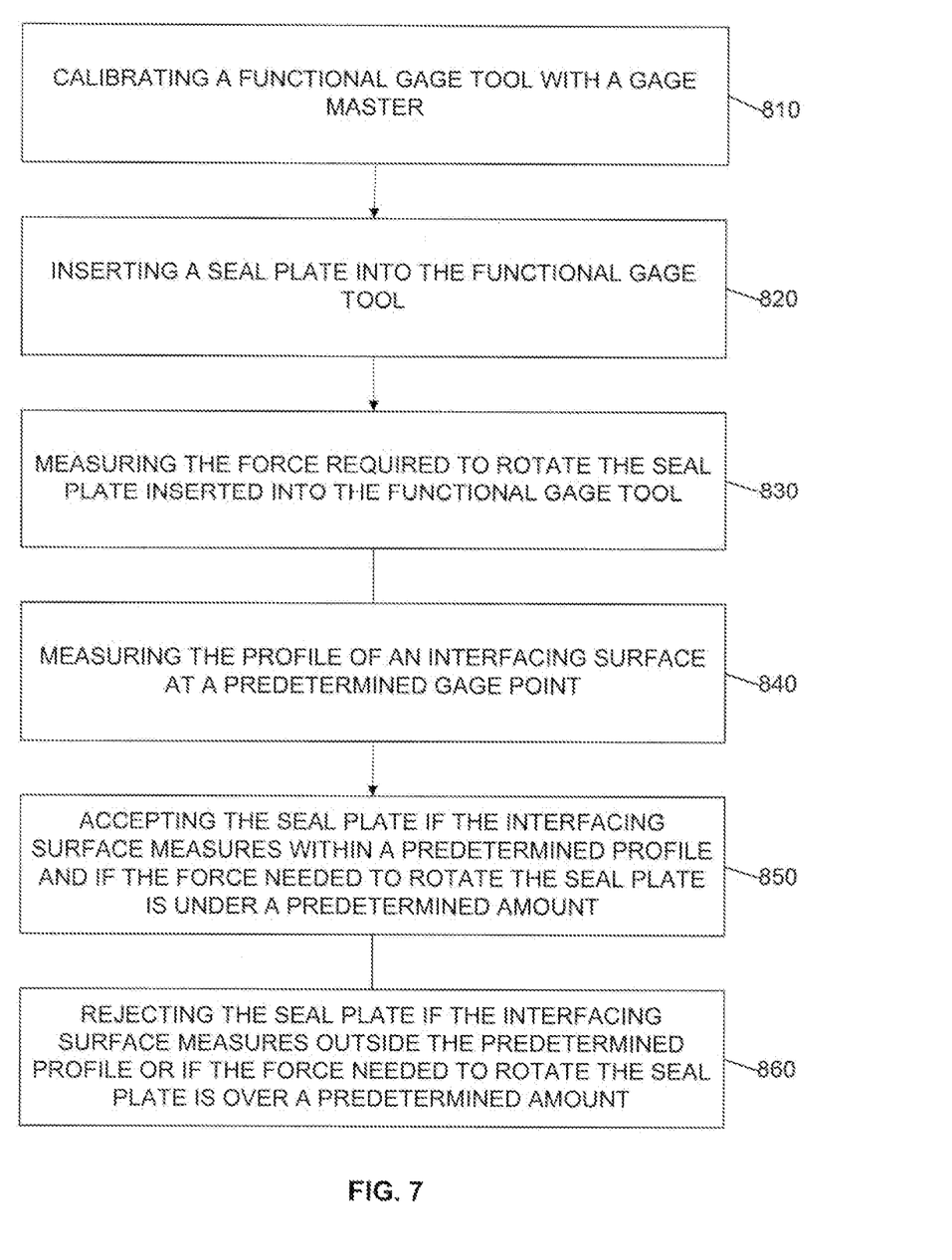
FIG. 7 is a flowchart of a method for inspecting a gas turbine engine seal plate.

FIG. 7 is a flowchart of a method for inspecting a gas turbine engine seal plate such as seal plate 430. The method includes calibrating a functional gage tool 700 with a gage master 705; the functional gage tool 700 includes a base plate 710 with a base opening 712, a top plate 720 with a top opening 723, a first gage 750, and a seal slide gage 740 at step 810. Calibrating the functional gage tool 700 with the gage master 705 may include inserting the gage master 705 into the functional gage tool 700 and using the gage master 705 to set a zero point for the first gage 750.

Step 810 may be followed by inserting a seal plate 430 into the functional gage tool 700 at step 820. Step 820 may also include removing the gage master 705 prior to inserting the seal plate 430. Step 820 may be followed by measuring the force required to rotate the seal plate 430 inserted into the functional gage tool 700 at step 830. The force to rotate the seal plate 430 may be applied by hand or by a separate tool and may be measured by a force gage such as seal slide gage 740. Step 820 may also be followed by measuring the profile of an interfacing surface such as outer interfacing surface 433 at a predetermined gage point such as chamfer gage point 434 at step 840.

Steps 830 and 840 can be followed by accepting the seal plate 430 if the interfacing surface measures within a predetermined profile and if the force needed to rotate the seal plate 430 is under a predetermined amount at step 850. Steps 830 and 840 may also be followed by rejecting the seal plate 430 if the interfacing surface measures outside the predetermined profile or if the force needed to rotate the seal plate 430 is over a predetermined amount at step 860.

Step 860 may be followed by heat treating the seal plate 430. Heat treating the seal plate 430 may remove or reduce internal stresses, which may remove or reduce irregularities in the flatness of seal plate 430. Steps 810 through 860 may be repeated after heat treating the seal plate 430.

It is understood that the steps disclosed herein (or parts thereof) may be performed in the order presented or out of the order presented, unless specified otherwise. For example, measuring the force required to rotate the seal plate 430 at step 830 may be performed prior to, after, or simultaneously to measuring the profile of an interfacing surface at step 840.

The preceding detailed description is merely exemplary in nature and is not intended to limit the invention or the application and uses of the invention. The described embodiments are not limited to use in conjunction with a particular type of gas turbine engine and gas turbine engine tooling. Hence, although the present disclosure, for convenience of explanation, depicts and describes a particular gage tool it will be appreciated that the gage toed in accordance with this disclosure can be implemented in various other configurations, can be used with various other types of gas turbine engines, and can be used in conjunction with other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A gage tool for inspecting tolerances of a gas turbine engine seal plate, the gage tool comprising:
    a base plate having
        a slot including an annular shape sized to receive a seal plate, and
        a base opening providing access to a portion of the seal plate that is placed within the gage tool;
    a top plate having
        a top opening providing access to a portion of the seal plate that is placed within the gage tool;
    a first gage having a probe tip for measuring a variation in an outer interfacing surface of the seal plate; and
    a seal slide gage for measuring a force required to rotate the seal plate within the gage tool.

2. The gage tool of claim 1, wherein the gage tool further includes a second gage having a probe tip for measuring a variation in the outer interfacing surface of the seal plate.

3. The gage tool of claim 1, wherein the top plate includes a ring insert, the ring insert being formed of a material harder than the material forming a remainder of the top plate, and wherein the ring insert forms a portion of a cross-sectional shape that encapsulates the seal plate.

4. The gage tool of claim 1, wherein the seal slide gage is a force gage and includes a thumb ring.

5. The gage tool of claim 1, further comprising:
    a plurality of clamp assemblies coupled to the base plate, each clamp assembly locks the top plate to the base plate into a closed position.

6. The gage tool of claim 1, further comprising:
    a hinge coupling the top plate to the base plate; and
    a handle connected to the top plate opposite the hinge.

7. The gage tool of claim 1, further comprising:
    a gage master for calibrating the first gage, the gage master having a cross-section of a nominal seal plate with a nominal outer interfacing surface in a perfect nominal condition, and a central interfacing surface and an inner interfacing surface in a maximum material condition.

8. The gage tool of claim 1, further comprising:
    a gage master for calibrating the first gage, the gage master having a cross-section of a nominal seal plate in a maximum material condition.

9. The gage tool of claim 1, wherein the probe tip is a plunger.

10. A gage tool for inspecting tolerances of a gas turbine engine seal plate, the gage tool comprising:
    a base plate having
        a slot including an annular shape sized to receive a seal plate, and
        a base opening in the base plate configured to provide access to a portion of the seal plate that is placed within the gage tool;
    a top plate having
        a top opening being a cut-out in the top plate configured to provide access to a portion of the seal plate that is placed within the gage tool;
        a ring insert including an annular shape located adjacent to the slot
    wherein the slot and the ring insert form an annular envelope and are configured to simulate an installation of the seal plate within a gas turbine engine aft of a turbine disk and turbine blades, and radially between a disk hook and a blade hook, with a cross-sectional shape of the annular envelope configured to simulate a cross-section of the seal plate installation location;

a seal slide gage located adjacent the base opening and the top opening, the seal slide gage being a force gage configured to measure a force required to rotate the seal plate within the gage tool.

11. The gage tool of claim 10, further comprising:

a first gage configured to measure a variation in an outer interfacing surface of the seal plate, the first gage being an indicator.

12. The gage tool of claim 11, further comprising:

a second gage configured to measure a variation in the outer interfacing surface of the seal plate, the second gage being an indicator located opposite the first gage.

13. The gage tool of claim 11, further comprising:

a gage master configured to calibrate the first gage, the gage master configured to duplicate the cross-section of a nominal seal plate with a nominal outer interfacing surface in a perfect nominal condition, and a central interfacing surface and an inner interfacing surface in a maximum material condition.

14. The gage tool of claim 11, further comprising:

a gage master configured to calibrate the first gage to a predetermined zero point, the gage master having a cross-section of a nominal seal plate.

15. The gage tool of claim 10, wherein the ring insert is formed of a material harder than a material used for other components of the top plate.

* * * * *